United States Patent Office 3,210,174
Patented Oct. 5, 1965

3,210,174
HERBICIDAL MULCH COMPOSITION OF HIGH STABILITY
Albert G. Harshman, Elizabeth, N.J., assignor to Esso Research and Engineering Company, a corporation of Delaware
No Drawing. Filed Sept. 18, 1962, Ser. No. 224,509
3 Claims. (Cl. 71—2.5)

The present invention is broadly concerned with establishing and sustaining agricultural crops in semi-arid areas by new and improved methods for conserving and utilizing available moisture. The invention is more particularly concerned with a unique asphaltic composition which comprises herbicides. In particular, the present invention relates to petroleum based coatings and to their use in new and improved methods for establishing and sustaining grass and other crops on lands which receive an insufficient amount of natural rainfall to provide sufficient moisture in the soil for seed germination and to sustain the growth of such crops and to prevent the growth of weeds during the critical seedling stage without irrigation. Specifically, the composition of the present invention comprises an asphalt emulsion containing a herbicide which is added as a hydrochloride salt. The particular class of herbicides are those containing one or more tertiary nitrogen atoms.

The present invention is particularly concerned with a unique asphalt composition and its application for use as an agricultural mulch. In essence, it is very desirable that the asphalt composition on the ground be a relatively hard asphalt having definite characteristics. It is also essential that the asphalt composition be emulsified, preferably as asphalt and water emulsion, so as to permit its efficient application to the ground so as to secure the desired spreading characteristics. It is essential that the emulsion be stable and not break until it is on the ground since these emulsions must be transported over a wide territorial area and ultimately be placed on the ground in the desired areas by suitable spreading equipment.

Millions of acres of potentially valuable grazing lands in the western half of the United States along with areas even more vast in other countries normally do not receive sufficient rainfall to reseed and establish grass crops suitable to maintain livestock within economically feasible geographical limits. Imprudent management in marginal cropping areas and overgrazing of poorly established grasslands followed by wind erosion has only served to accentuate the problem. Attempts to seed or reseed these semi-arid lands with suitable range grasses have resulted in the expenditure of large sums in labor and material. Even so, the seeding techniques employed in the past have been only about 10 to 30% successful in the moisture limited areas.

It has now been discovered that the moisture necessary for both seed germination and early plant growth can be maintained in the seed bed by applying certain asphalt emulsions over such seed beds according to the methods hereinafter set forth in detail. It has also been discovered that unexpected desirable results are secured by using an asphalt emulsion with a pre-emergence weed-killer.

According to this invention the emulsion is preferably applied after seeding and preferably when the moisture content of the seed bed is at or near field capacity. Field capacity is defined as the amount of water held in the soil after excess water has drained away via gravitational force and after the rate of downward movement of water has materially decreased. The asphalt strip covering the seed bed then tends to function in a manner similar to a "one way valve." When a rainfall occurs which is sufficient to temporarily saturate the top layer of soil the lateral movement of moisture is relatively rapid, i.e. at a rate of several inches per hour with some variance which is dependent upon the type of soil. When rainfall ceases and the field drains or is otherwise depleted of moisture to the level of field capacity or below, the rate of lateral migration drops off sharply until such movement is negligible and for all practical purposes may be considered as non-existent. During the short periods of surface saturation rainfall on the uncoated areas will move under the coated strips to replenish the moisture of the seed bed. When the saturated condition in the uncoated areas ceases to exist, the moisture which has moved beneath the coated strips is trapped and will not be lost to any appreciable extent either by lateral movement or surface evaporation.

In accordance with the present invention, by utilizing an asphalt applied as described above in conjunction with a pre-emergence weed-killer, unexpected desirable results are secured. Furthermore, in accordance with the present invention, by utilizing the herbicide as a hydrochloride salt, conglomeration and separation of the asphalt emulsion is prevented.

Asphalt emulsions which are suitable for use with this invention may be either acidic (cationic) or basic (anionic) although the acidic emulsions are preferred. Both are asphalt-in-water emulsions. Typical specifications for both types are listed in the following table.

TABLE I

Characteristic and composition of acidic and basic emulsion concentrates

| | Basic | Acidic |
|---|---|---|
| Emulsion Characteristics: | | |
| Viscosity, Saybolt Fural @ 77° F. | 10–200 | 10–200 |
| Residue (by distillation) wt. percent | 57–70 | 57–70 |
| Settlement, 5 days, wt. percent | 0–20 | 0–20 |
| Residue Characteristics: | | |
| Penetration @ 77° F., 100 g.; 5 sec. | 10–200 | 10–200 |
| Solubility in $CS_2$, percent | 97+ | 97+ |
| Ductility @ 77° F., cm | 40+ | 40+ |
| Softening Point,° F. | 100–175 | 100–175 |
| Composition, Wt. percent: | | |
| Water | 30–43 | 30–43 |
| Asphalt | 57–70 | 57–70 |
| Emulsifier (Preferably polyamines for acidic emulsions, fatty acids for basic) | 0.10–10.0 | 0.1–10.0 |
| NaOH | 0.1–1.0 | |
| HCl (36%) | | 0.1–1.0 |

Suitable emulsifying agents for use in preparing these emulsions include the following:

CATIONIC AGENTS (1). Primary, secondary, tertiary, and polyamine salts such as the diamine dichloride.

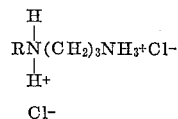

where R is an alkyl chain with 16–18 carbon atoms. In general, the alkyl chains of the amines may contain 8–22 carbon atoms with 16–18 being preferred.

(2) Amines such as those used in forming the salts of (1) condensed with 1–10 moles of ethylene oxide per mole of amine such as

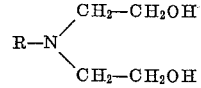

where R is as defined in (1).

(3) Quaternary ammonium salts such as

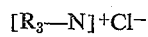

(4) Dimethylated amine salts such as

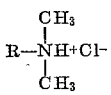

(5) Aromatic amine salts and cyclic amine salts.
(6) 2-imidazoline.

ANIONIC AGENTS

Alkali metal salts of fatty acids such as

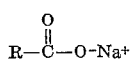

where R is an alkyl or olefinic chain with 8–22 carbon atoms, preferably 14–18. The potassium salt may also be used. Also, the emulsifying agent is not always one specific compound but could be a mixture of salts of fatty acids in which R varied in length. Examples of these are a sodium salt of pine wood lignin and a salt of a long chain acid resin from the destructive distillation of pine wood stumps; also fine clays such as bentonite can be used.

Whereas, the actual emulsifying agents for the cationic and anionic emulsions are the amine salts or fatty acid salts, these salts are usually formed in the aqueous emulsifying solution by reaction of the amine with an acid such as HCl and the fatty acid with a base such as NaOH. Possible substitutes for the HCl and NaOH therefore exist. Acetic acid ($CH_3COOH$) or nitric acid ($HNO_3$) could be used instead of HCl on a mole per mole basis. Also, KOH could be used instead of NaOH although the latter is cheaper.

For the purposes of this invention the emulsions set forth in Table I may, for want of a better term, be referred to as emulsion concentrates. For the purposes of this invention, such emulsions are further diluted with 0.1 to 3 parts of water prior to application. For minimizing evaporation losses with soils in general it has been found that optimum results are obtained when about 1.0 to 1.70, preferably about 1.3, volumes of water are employed per equivalent volume of emulsion concentrate. More specifically, maximum effectiveness in retarding evaporation from a silt loam type soil while using a minimum amount of emulsion is obtained by spraying onto the soil an emulsion as characterized in Table I diluted to the extent of 1.18 ±0.25 to 1.47 ±0.25 volume of water per volume of emulsion, such dilution increasing linearly from the low dilution to the higher dilution as the soil density decreases from about 1.60 to 1.20 gm./cm.$^3$. These emulsions may be prepared in the conventional manner, as follows:

The emulsifying solution of the desired formulation at a temperature of 120° to 150° F. and the asphalt at a temperature of about 240° F. may be fed in separate streams to a conventional colloid mill. Other conventional techniques for effecting emulsification may be employed if colloid milling is not convenient. The preferred emulsification temperature is about 180°–190° F. A thin continuous film of such emulsions will retard evaporation rates by 90 to 99% as compared to bare soil. Such emulsions (based on undiluted emulsion concentrate) should be applied at a rate in the range of 150 to 1000, preferably 250 to 750 ga. per acre of coverage. Thus, the present invention is concerned with the use of asphalt emulsions, particularly acidic asphalt emulsions with a herbicide. The asphalt emulsions may comprise from about 10 to 75% by weight of asphalt and 90 to 25% by weight of water. However, it is preferred that the herbicides of the present invention be utilized in asphalt emulsions where the percent by weight of asphalt present is in the range from about 40 to 55% by weight. As pointed out heretofore, when herbicides are added to asphaltic emulsions, these emulsions tend to conglomerate, particularly if the herbicide contains one or more tertiary nitrogen atoms as, for example, Atrazine (2-chloro-4-ethylamino-6-isopropylamino-s-triazine) and Simazine (2-chloro-4,6-bis(ethylamino)-s-triazine). These compounds can be made compatible with an acidic asphalt or other acidic resin emulsions by forming a hydrochloride salt with one or more of the tertiary nitrogen atoms in these herbicides. The resulting compound gives herbicidal protection equal to the parent compound and can be used successfully to produce stable acidic emulsions.

In order to further illustrate the invention, the following examples are given.

*Example 1*

Atrazine when added to an acidic asphalt emulsion as a wettable powder and with a solvent immediately caused the asphalt emulsion to conglomerate and the emulsion to separate.

*Example 2*

In a second test, sufficient hydrochloric acid plus a small excess was added to Atrazine to form the single hydrochloride salts. The compounds used were as follows:

| | Grams |
|---|---|
| 22° Baumé HCl | 10 |
| Atrazine 80 w. (80% wettable powder) | 20 |
| Distilled water | 170 |

These were blended to form a milky suspension.

Thirty-four grams of the above blend was added to 6000 grams of an acidic emulsion to give a commercial concentration of herbicide. The following tests were performed on this product.

(1) Emulsion stability
(2) Herbicidal effectiveness (crop response)
(3) General observations The product formed a stable emulsion and the usual jelling effects which occur when Atrazine is added to an acidic emulsion did not occur. The emulsion stability tests on this product were as follows:

| | Above Product | Parent Emulsion |
|---|---|---|
| Sieve Test (material retained on 20 mesh screen, wt. percent) | 0.07 | 0.08 |
| Emulsion Settlement 5 Days, wt. percent | 0.00 | 0.00 |

These tests show equivalent emulsion stability.

*Example 3*

A test to determine if the herbicidal effectiveness of the Atrazine was affected were carried out. The following treatments were applied to three crops, lima beans, cucumbers and corn.

(A) Above formulation at the equivalent of 2 lbs./acre of Atrazine.
(B) Atrazine applied as an aqueous spray followed by a mulch application on top.
(C) Atrazine applied as an aqueous spray.
(D) Control area.

After 25 days of growing time all three formulations had given absolute weed control, i.e. no weeds of any kind were found while on the control areas weeds were in abundance. All three herbicide treatments were given the highest possible effectiveness rating.

The herbicides were also evaluated for crop injury. Treatments A, B and C completely killed the cucumbers, a very sensitive crop.

Treatments A, B and C all showed injury effects on the lima beans. However, treatments A and B, the mulched treatments, were less injurious than treatment C. Treatments A, B and C were all free from corn injuring effects.

In general, various herbicides may be utilized as, for example, those selected from the following table.

CHEMICAL NAMES OF HERBICIDES

| Trade name: | Chemical name |
|---|---|
| Alanap #1 | N-1-naphthyl phthalamic acid |
| Alanap #3 | Sodium salt of N-1-naphthyl phthalamic acid |
| Amine DNOSBP | Amine salts of 4,6-dinitro ortho secondary butyl phenol |
| DNOSBP | 4,6-dinitro ortho secondary butyl phenol |
| Chloro IPC | Isopropyl N - meta - chlorophenyl carbamate |
| Vegadex | 2-chloroallyl - diethyl-dithiocarbamate |
| Randox | α-chloro - N,N - diallylacetamide |
| Eptam | Ethyl N,N-di-n-propylthiol carbamate |
| Diuron | 3, - (3,4 - dichlorophenyl)-1,1-dimethylurea |
| Monuron | 3 - (p - chlorophenyl) - 1,1-dimethylurea |
| Atrazine | 2-chloro-(4 ethyl amino, 6 isopropyl amino) - S - triazine |
| Simazine | 2 - chloro - 4,6 - bis(ethyl amino)-S-triazine |
| 2,4-D | 2,4-dichloro phenoxy acetic acid |
| Sesone | Sodium 2,4-dichlorophenoxyethyl sulfate |
| Dalapon | 2,2 - dichloropropionic acid (No salt) |

The concentration of the herbicide based on the active ingredient may vary in the range from about 0.02% to 6.0%, preferably in the range from about 0.4% to 3.0% as compared to the weight percent of the asphalt present in the emulsion.

It is, of course, within the scope of the present invention to use the mulching compositions herein disclosed along with other mulching compositions and with other agricultural techniques. For example, the ground may be prepared by mulching with peat moss prior to the application of the mulch emulsions herein described. Other soil conditioning agents such as polyacrylates, vermiculite, etc., may be incorporated into the soil before applying the mulch emulsions. Also, pre-emergence herbicides may be soaked into the ground before the herbicidal emulsions of the present invention are applied on the surface of the ground. This procedure is particularly advantageous when the herbicides put into the ground are somewhat volatile. Furthermore, volatile fertilizers, for example ammonia, can be introduced into the ground prior to application of the mulch of the present invention. Under these conditions, the fertilizer can serve to promote the germination of the weeds, which will then be killed by the herbicidal mulch. Similarly, in orchards and olive groves the ground may be sterilized by the action of volatile fumigants, for example chloropicrin, to destroy grubs and nematodes, and the action of the volatile or gaseous fumigants will be enhanced by having the ground covered with a film of mulch substantially impervious to the gases therein.

What is claimed is:

1. An improved, stable, acidic, aqueous asphalt, weed-killing, mulch emulsion consisting essentially of 10 to 75 wt. percent asphalt, 90 to 25 wt. percent water and 0.02 to 6.0 wt. percent of an herbicidal, symmetrical triazine suspended in aqueous hydrochloric acid.

2. The emulsion of claim 1 wherein said triazine suspended in said aqueous hydrochloric acid is Simazine (2-chloro-4, 6-bis(ethylamino)-s-triazine).

3. The emulsion of claim 1 wherein said triazine suspended in said aqueous hydrochloric acid is Atrazine (2-chloro-4-ethylamino-6-isopropylamino-s-triazine).

References Cited by the Examiner

UNITED STATES PATENTS

| 1,882,377 | 10/32 | Whittelsey | 71—2.1 X |
| 1,988,175 | 1/35 | Merrill | 47—9X |
| 2,333,959 | 11/43 | Smith | 47—9 |
| 2,741,550 | 4/56 | Edmond et al. | 71—2.4 |
| 2,770,537 | 11/56 | Smith et al. | 71—2.6 X |
| 2,851,824 | 9/58 | Campbell | 71—1 |
| 3,061,974 | 11/62 | Louis et al. | 47—9 |

OTHER REFERENCES

Metcalf: Advances in Pest Control Research, vol. 1, 1957, pages 39 to 78 (page 72 particularly relied upon).

Smith II: The Effect of Asphalt Mulches on The Stabilization of Soils and Aggregate Materials and on Vegetation Cover, an abstract of a thesis. 1953, pages 1 to 9.

LEWIS GOTTS, *Primary Examiner.*